Patented Nov. 24, 1925.

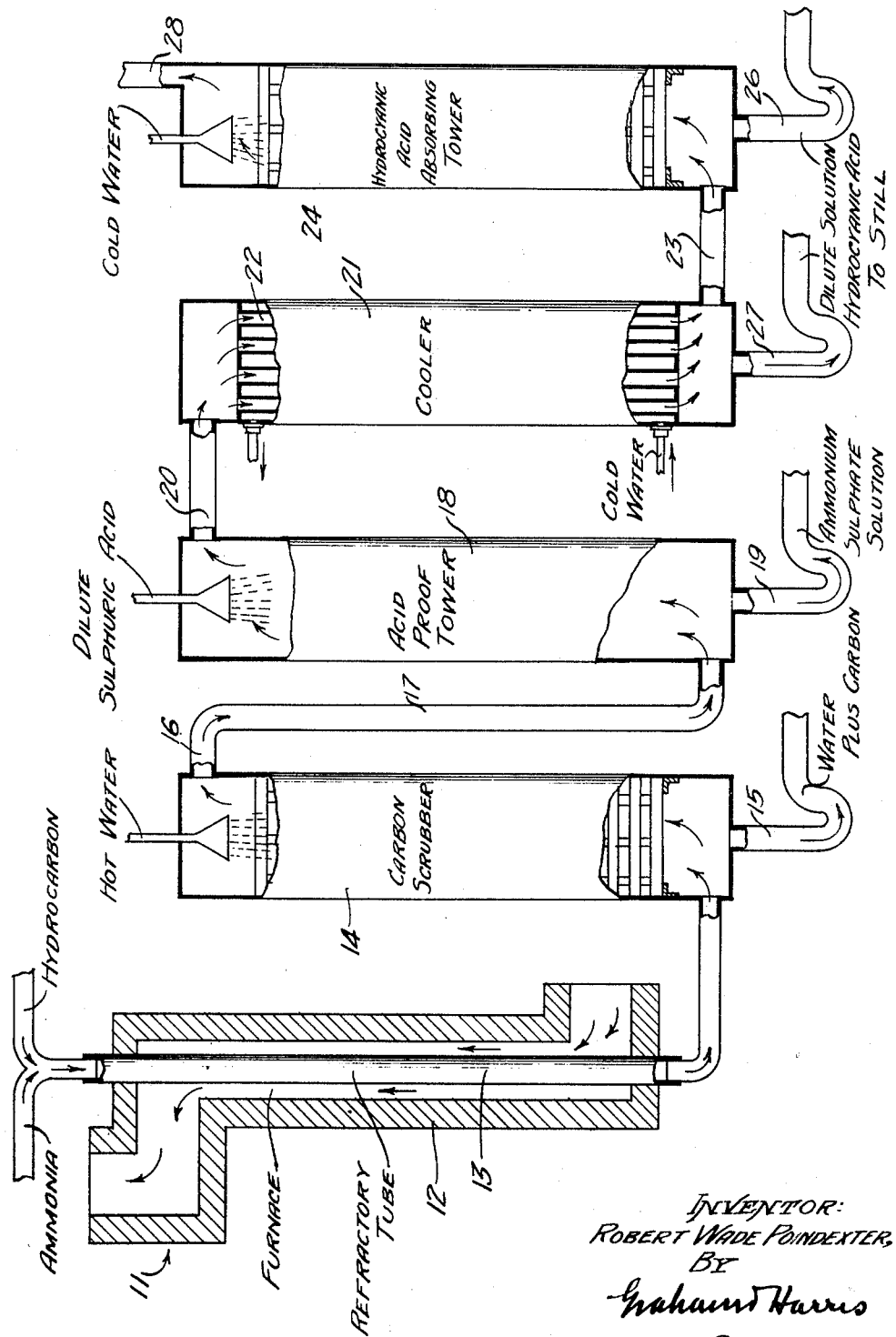

1,562,914

UNITED STATES PATENT OFFICE.

ROBERT WADE POINDEXTER, OF LOS ANGELES, CALIFORNIA, ASSIGNOR, BY MESNE ASSIGNMENTS, TO CALIFORNIA CYANIDE COMPANY, INC., A CORPORATION OF DELAWARE.

PROCESS FOR PRODUCING CARBON AND HYDROCYANIC ACID.

Application filed December 4, 1922. Serial No. 604,794.

*To all whom it may concern:*

Be it known that I, ROBERT WADE POINDEXTER, a citizen of the United States, residing at Los Angeles, in the county of Los Angeles, State of California, have invented a new and useful Process for Producing Carbon and Hydrocyanic Acid, of which the following is a specification.

My invention relates to the art of producing carbon, being more particularly a process by means of which a high grade of carbon is produced, being a finely divided amorphous carbon suitable for use as paint pigment and such other uses as carbon of such quality may be put commercially.

The main object of my invention is to provide a process whereby carbon of this desirable nature may be produced through the decomposition of hydrocarbon gases or vapor. It is already known that carbon may be produced from such materials as natural gas, vaporized petroleum oils and distillates and the like by means of heat, but much of the carbon thus produced is of very inferior quality and not suitable for purposes where the highest grade of carbon is required.

I have discovered that by mixing ammonia gas with the hydrocarbon gas or vapor which it is desired to use, and then heating the mixture, a satisfactory pigment carbon can be produced. At the same time, under proper conditions, the major portion of the ammonia used is converted into hydrocyanic acid, which is also a valuable product, and by securing this additional product, the cost of the ammonia used may be defrayed.

Referring to the drawing, which is for illustrative purposes only, the figure represents a side elevation of an apparatus partly in section diagrammatically illustrated by means of which the process may be carried out.

For the purpose of carrying out my invention, I make a mixture containing from twelve to seventy parts by volume of ammonia, the balance being hydrocarbon gas, such as natural gas or vaporized stove distillate, gasolene, kerosene, or similar light hydrocarbon products. I then pass this mixture through a heater indicated at 11 consisting of a firebrick furnace 12, through which extends a tube of refractory material 13, such as fireclay, alumina, silicon carbide, graphite or other material conveniently obtainable, such refractory tube being heated in the furnace to a temperature of from 1250 to 1750 degrees centigrade.

The mixture of hydrocarbon and ammonia is introduced into the upper end of the tube 13 and passes downwardly through the tube. It is important that the rate at which the mixture passes through the tube be carefully regulated. In general, I find it advantageous to pass the mixture through the tube as rapidly as is possible consistent with the attainment of the desired conversion into carbon and hydrocyanic acid. Since hydrocyanic acid contains carbon, it is obvious that a certain proportion of the carbon originally contained in the hydrocarbon used is contained in this product, the remainder of the carbon appearing in a form suitable for the above enumerated uses. The major portion of the ammonia used is combined during the heating of the mixture with carbon to form hydrocyanic acid, a minor portion goes through the process unchanged, and a small portion is broken down into elementary nitrogen. The sum of the hydrogen contained originally in the hydrocarbon and in the ammonia, less the hydrogen which enters into the hydrocyanic acid appears in the mixture leaving the heated enclosure as free hydrogen.

The rate at which it is most advantageous to pass the mixture through the heated space depends on the temperature of the refractory material. The higher the temperature of this material, the more rapidly may the mixture be passed through while still permitting time for it to take up sufficient heat to become raised to the requisite reaction temperature and sufficient additional heat to enable the necessary endothermic reactions which result in the formation of free carbon, hydrocyanic acid and free hydrogen to take place. I have found in practice that it is easy for the person operating the process to secure a satisfactory rate of passage through the tube by paying attention to the rate of passage, since, if this is too slow, naphthalene, and other undesirable products are produced, while if it is too rapid, the quality of carbon produced and the yield of hydrocyanic acid obtained are both unsatisfactory. In general, the time that the reaction mixture remains within the heater should not exceed two seconds, and may be much less than this. As above stated, the time must depend on the temperature of the refractories since the heat must not be allowed to reach a point at which the particular refractory in use will be melted or otherwise destroyed.

The mixture coming from the tube 13, consisting of finely divided carbon suspended in a gas consisting of hydrocyanic acid, hydrogen, nitrogen, unchanged ammonia and other gases, depending upon the impurities which may be present in the original mixture, is passed into the lower end of a carbon scrubber indicated at 14. Hot water, being sprayed into the upper end of the scrubber and passing downwardly through the gases, removes the carbon therefrom, such carbon being removed through an outlet 15 in the bottom of the scrubber with the water passing therefrom. During this washing operation some water vapor is formed. This vapor is introduced into the resultant mixture of gases and passes with the gases through an outlet 16, being conveyed through a conduit or pipe 17 into the lower portion of an acid proof tower indicated at 18. Dilute sulphuric acid is sprayed into the tower 18 which removes the ammonia from the gases passing through the tower, the ammonia, in the form of ammonium sulphate, being drawn off by means of a suitable outlet indicated at 19.

The gases passing from the tower 18, containing hydrogen, hydrocyanic acid and other gases, pass through a pipe 20 to the upper portion of a cooler 21, such cooler consisting of tubes 22 through which the gas is passed, the space surrounding such tubes being filled with cold water which causes a condensation of most of the water vapor in the gases, such condensed water containing part of the hydrocyanic acid. The remaining gases pass from the cooler 21 through a pipe or passage 23 to an absorption tower indicated at 24 through which the mixture passes upwardly, cold water being sprayed into the top of such tower and passed downwardly therethrough absorbing the hydrocyanic acid from the gases, such acid being discharged from the bottom of the tower through a pipe 26 when it is conveyed with the water from the cooler 21 which is delivered therefrom by a pipe 27 to any suitable still for distillation. The remaining gases, after passing through the absorption tower 24, are discharged from the top of the tower through a passage 28.

While I have above referred to proportions of the mixture to be treated in general, the following example more definitely sets forth a specific example, for instance, a mixture is formed containing thirty per cent by volume of gaseous ammonia and seventy per cent by volume of natural gas. (This particular mixture will contain about the same percentage proportion of the two constituents by weight.) After passing through the heated conversion apparatus, the issuing gases will have approximately the following composition by volume, not accounting for small amounts of impurities which may have been introduced:

|  | Per cent. |
|---|---|
| Hydrogen | 84 |
| Hydrocyanic acid | 11 |
| Ammonia | 4 |
| Nitrogen | $\tfrac{8}{10}$ |

This mixture of gases will carry approximately six pounds of finely divided carbon for each one thousand cubic feet of gas, figured at one hundred degrees centigrade and atmospheric pressure.

While I have diagrammatically illustrated a heating means consisting of a furnace with a tube of refractory material extending therethrough, it is to be understood that I may employ any convenient heating means without departing from the spirit of my invention as well as modified forms of the other apparatus illustrated.

I claim as my invention:

1. A process for the simultaneous production of carbon and hydrocyanic acid, which comprises mixing a hydrocarbon with ammonia and introducing the unheated mixture to an externally heated zone in which it is rapidly raised to the temperature of the reaction.

2. A process for the simultaneous production of carbon and hydrocyanic acid, which comprises mixing a hydrocarbon with ammonia and introducing the unheated mixture to an externally heated zone in which it is rapidly raised to a temperature in excess of 1250° C.

3. A process for the simultaneous production of carbon and hydrocyanic acid, which comprises mixing a hydrocarbon in the gaseous phase with ammonia and introducing the unheated mixture to an externally heated zone in which it is rapidly raised to the temperature of the reaction.

4. A process for the simultaneous production of carbon and hydrocyanic acid, which comprises mixing natural gas with ammonia and introducing the unheated mixture to an externally heated zone in which it is rapidly raised to the temperature of the reaction.

5. A process for the simultaneous production of carbon and hydrocyanic acid, which comprises mixing a hydrocarbon with ammonia, introducing the unheated mixture to an externally heated zone in which it is rapidly raised to the temperature of the reaction, removing the carbon by contact with water and separately recovering ammonia and hydrocyanic acid from the remaining vapors.

In testimony whereof, I have hereunto set my hand at Los Angeles, Californa, this 24th day of November, 1922.

ROBERT WADE POINDEXTER.